(12) United States Patent
Chen et al.

(10) Patent No.: US 9,211,008 B2
(45) Date of Patent: Dec. 15, 2015

(54) SLIDE ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Shih-Lung Huang, Kaohsiung (TW); Ting-Tsai Huang, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 0 days.

(21) Appl. No.: 14/160,780

(22) Filed: Jan. 22, 2014

(65) Prior Publication Data
US 2015/0201752 A1    Jul. 23, 2015

(51) Int. Cl.
| | |
|---|---|
| A47B 88/00 | (2006.01) |
| A47B 88/14 | (2006.01) |
| A47B 88/04 | (2006.01) |
| F16C 29/00 | (2006.01) |
| F16C 29/04 | (2006.01) |

(52) U.S. Cl.
CPC ............... *A47B 88/14* (2013.01); *A47B 88/044* (2013.01); *A47B 88/0418* (2013.01); *A47B 88/0422* (2013.01); *A47B 88/0466* (2013.01); *F16C 29/004* (2013.01); *F16C 29/048* (2013.01)

(58) Field of Classification Search
CPC ................ A47B 88/04; A47B 88/044; A47B 2210/0059; A47B 2210/0032
USPC .......... 312/334.4, 334.5, 334.7, 334.9; 384/18
See application file for complete search history.

(56) References Cited

U.S. PATENT DOCUMENTS

| | | | | |
|---|---|---|---|---|
| 2,711,358 | A * | 6/1955 | Gussack | 312/333 |
| 3,937,531 | A * | 2/1976 | Hagen et al. | 384/18 |
| 4,289,290 | A * | 9/1981 | Miller | 248/251 |
| 5,257,861 | A * | 11/1993 | Domenig et al. | 312/334.5 |
| 5,316,389 | A * | 5/1994 | Hoffman | 384/18 |
| 5,387,033 | A * | 2/1995 | Domenig | 312/334.5 |
| 5,411,333 | A * | 5/1995 | Hoffman | 384/18 |
| 5,449,231 | A * | 9/1995 | Lin | 312/334.18 |
| 5,457,867 | A | 10/1995 | Maberry et al. | |
| 5,466,060 | A * | 11/1995 | Hoffman | 312/334.8 |
| 5,507,571 | A * | 4/1996 | Hoffman | 312/334.8 |
| 5,597,220 | A * | 1/1997 | Domenig et al. | 312/334.4 |
| 5,611,637 | A * | 3/1997 | Brustle et al. | 403/297 |
| 5,636,820 | A * | 6/1997 | Domenig | 248/220.21 |
| 5,683,159 | A * | 11/1997 | Johnson | 312/334.7 |
| 5,775,786 | A * | 7/1998 | Liebertz | 312/334.8 |
| 5,806,949 | A * | 9/1998 | Johnson | 312/334.7 |
| 5,895,101 | A | 4/1999 | Cabrales et al. | |
| 5,980,007 | A * | 11/1999 | Singh | 312/334.1 |

(Continued)

*Primary Examiner* — Daniel J Troy
*Assistant Examiner* — Kimberley S Wright
(74) *Attorney, Agent, or Firm* — Rosenberg, Klein & Lee

(57) ABSTRACT

A slide assembly includes a first rail, a second rail and at least one positioning device. The first rail has a first elongate body. The second rail is slidable relative to the first rail and has a second elongate body. At least one of the first elongate body and the second elongate body has an opening. The at least one positioning device has a support member and a dowel. The support member has a fixing portion and a resilient arm connected to the fixing portion. The fixing portion is fixed to the at least one of the first elongate body and the second elongate body. The dowel is disposed on the resilient arm and corresponds in position to the opening.

4 Claims, 9 Drawing Sheets

(56) References Cited

U.S. PATENT DOCUMENTS

| | | | |
|---|---|---|---|
| 6,106,185 A * | 8/2000 | Isele et al. | 403/297 |
| 6,402,276 B1 * | 6/2002 | King | 312/334.7 |
| 6,416,145 B1 * | 7/2002 | Singh | 312/334.1 |
| 6,494,550 B1 * | 12/2002 | Chen et al. | 312/334.5 |
| 6,712,435 B2 | 3/2004 | Kim et al. | |
| 6,902,244 B1 * | 6/2005 | Chen | 312/334.4 |
| 7,108,143 B1 * | 9/2006 | Lin | 211/183 |
| 7,331,644 B2 * | 2/2008 | Lowe | 312/334.4 |
| 7,744,176 B2 | 6/2010 | Milligan | |
| 8,876,232 B2 * | 11/2014 | Anderson et al. | 312/334.7 |
| 2002/0043914 A1 * | 4/2002 | Munday et al. | 312/334.7 |
| 2003/0107308 A1 * | 6/2003 | Kueng et al. | 312/334.1 |
| 2004/0104651 A1 * | 6/2004 | Kreft et al. | 312/334.5 |
| 2006/0028104 A1 * | 2/2006 | Tseng et al. | 312/334.44 |
| 2006/0201899 A1 * | 9/2006 | Lin | 211/183 |
| 2013/0077900 A1 * | 3/2013 | Lowe et al. | 384/18 |
| 2013/0106271 A1 * | 5/2013 | Anderson et al. | 312/334.9 |

* cited by examiner

A-A

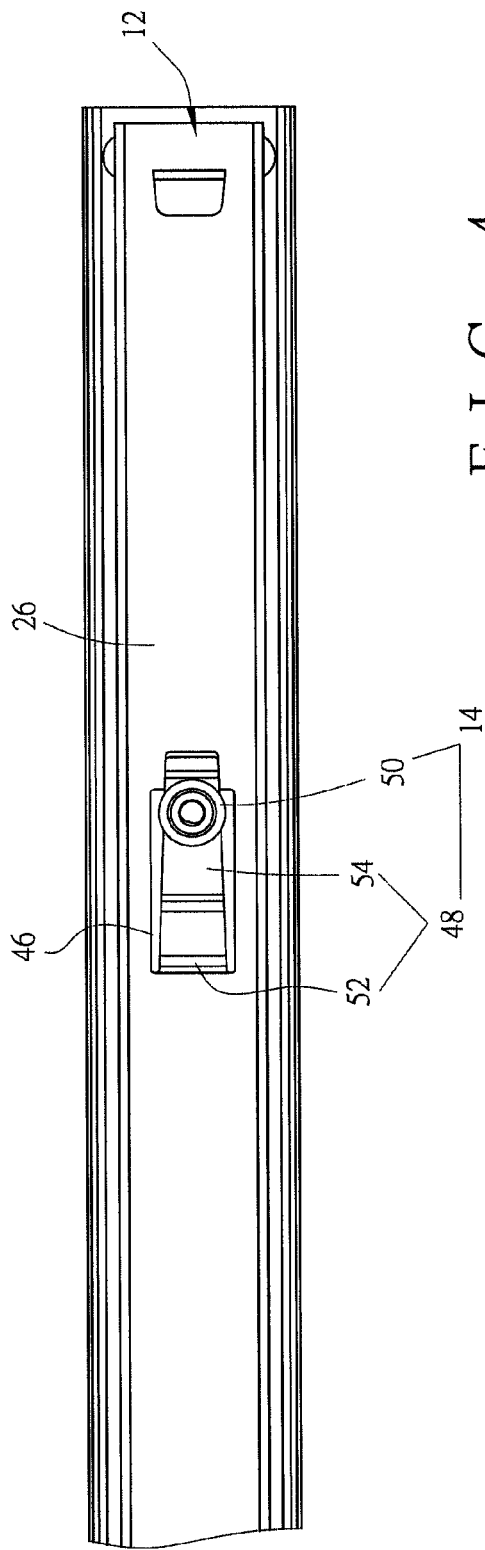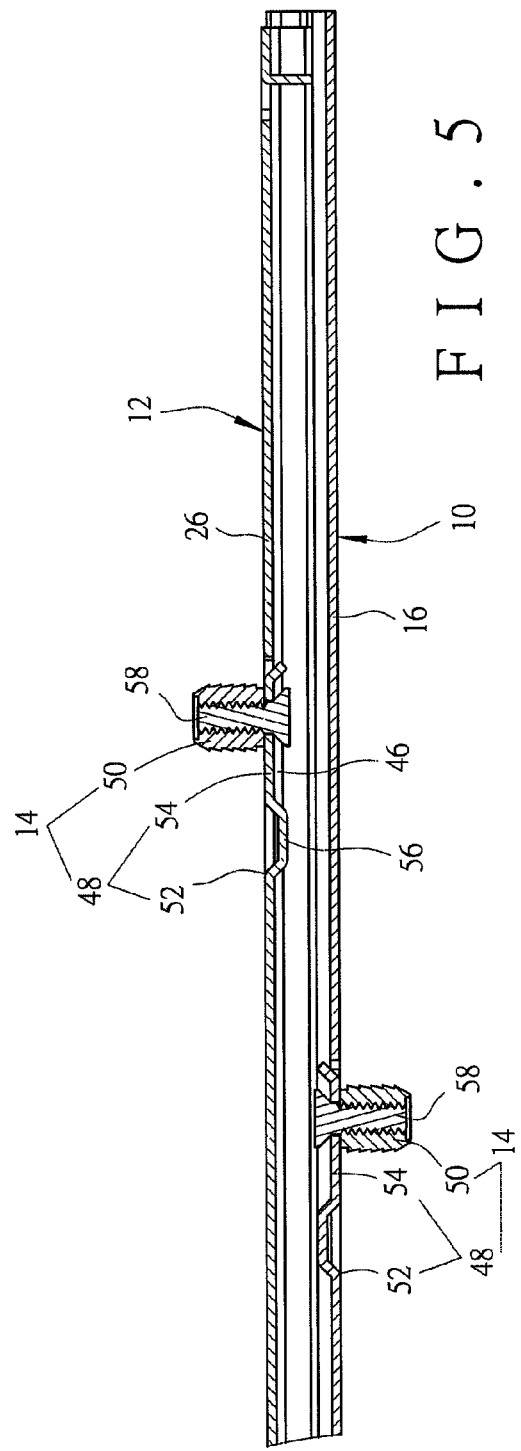

SLIDE ASSEMBLY

FIELD OF THE INVENTION

The present invention relates to a slide assembly, and more particularly, to a slide assembly capable of quickly installed between a cabinet and a drawer.

BACKGROUND OF THE INVENTION

U.S. Pat. No. 5,457,867 to Maberry et al. discloses a slide assembly and is incorporated herein by reference, which uses rollers 24, 40 as sliding media and comprises a cabinet member 14 and a drawer member 38 slidably connected to the cabinet member 14. When assembling, the cabinet member 14 is fixed to a cabinet panel 12 by a pair of bushings 16, 18 and a pair of screws 20A, 20B, and the drawer member 38 is fixed to a side of a drawer 36 such that the drawer 36 is slidably connected to the cabinet member 14 by the drawer member 38 and easily slides relative to the cabinet panel 12.

The slide assembly using the rollers 24, 40 mentioned above allows a larger assembly tolerance between the drawer 36 and the cabinet panel 12, so that, for the furniture manufacturers, the precision for the drawer 36 and the cabinet panel 12 can be compromised and needs not to be compared with industrial precision. Therefore, the slide assemblies using rollers 24, 40 are widely used on furniture combinations. Nevertheless, the slide assemblies using the rollers have restriction of the loads. Furthermore, as to compensate the assembly tolerance, the slide assemblies are not easily to be combined with soft-closing or push-open design to increase their values.

U.S. Pat. No. 5,895,101 to Cabrales et al. discloses a slide assembly and is incorporated herein by reference, which uses ball bearings as sliding media, and the ball bearings have higher standard of precision and can bear relative high load, so that they are welcomed by customers. Furthermore, the ball bearings can be combined with soft-closing design, such as the disclosure of U.S. Pat. No. 6,712,435 B2 to Kim et al. However, the high precision of the ball bearings makes them to be squeezed by the drawer and the cabinet when the assembly tolerance between the drawer and the cabinet is beyond the permissible range of the slide assembly. This will result awkward operation of the drawers.

U.S. Publication No. 2013/0106271 A1 to Anderson et al. discloses a rail assembly having at least one fixed member 56 and at least one floating member 54 and is incorporated herein by reference. The at least one fixed member 56 is transversely connected to a drawer slide, and the at least one floating member 54 is transversely and slidably connected to the fixed member 56. This arrangement permits a relatively large assembly tolerance between the drawer and the cabinet.

However, once the floating member 54 has a quality flaw such as the floating member is broken or the assembly tolerance between the drawer and the cabinet is too large, the floating member 54 might drop from the fixed member 56, and thus, the position to which the whole set of the rail assembly is installed does not permit to have the relative large tolerance between the drawer and the cabinet.

The present invention intends to provide a slide assembly that has a support member which is able to move a limited distance so as to compensate the displacement because of installation tolerance.

SUMMARY OF THE INVENTION

The present invention relates to a slide assembly. The slide assembly comprises a first rail having a first elongate body. A second rail is longitudinally slidable relative to the first rail and has a second elongate body, wherein at least one of the first elongate body and the second elongate body has an opening. At least one positioning device has a support member and a dowel. The support member has a fixing portion and a resilient arm connected to the fixing portion. The fixing portion is fixed to the at least one of the first elongate body and the second elongate body. The dowel is disposed on the resilient arm of the support member and corresponds in position to the opening.

Preferably, a fixing member transversely extends through the resilient arm of the support member and is securely fixed to the dowel.

Preferably, at least one portion of the resilient arm is fitted within the opening to be supported by an inner wall of the opening.

Preferably, at least one portion of the resilient arm is fitted within the opening, the resilient arm has a bent portion, and the bent portion abuts against an inner wall of the opening when the at least one portion of the resilient arm is moved in response to a force applied thereon.

Preferably, a ball bearing retainer is disposed between the first rail and the second rail. The ball bearing retainer retains a plurality of ball bearings therewith so as to facilitate sliding movement of the second rail relative to the first rail.

Preferably, an intermediate rail is slidably connected between the first rail and the second rail. A first ball bearing retainer is disposed between the first rail and the intermediate rail and retains a plurality of first ball bearings therewith so as to facilitate sliding movement of the intermediate rail relative to the first rail. A second ball bearing retainer is disposed between the second rail and the intermediate rail and retains a plurality of second ball bearings therewith so as to facilitate sliding movement of the second rail relative to the intermediate rail.

Preferably, the slide assembly further comprises a connection frame having a slot and at least one latch, wherein a distal end of the first rail is inserted into the slot of the connection frame.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 4 is a top view of the slide assembly in accordance with the preferred embodiment of the present invention;

FIG. 5 is a side view of the slide assembly in accordance with the preferred embodiment of the present invention;

DETAILED DESCRIPTION OF THE PREFERRED EMBODIMENT

Figure 1:
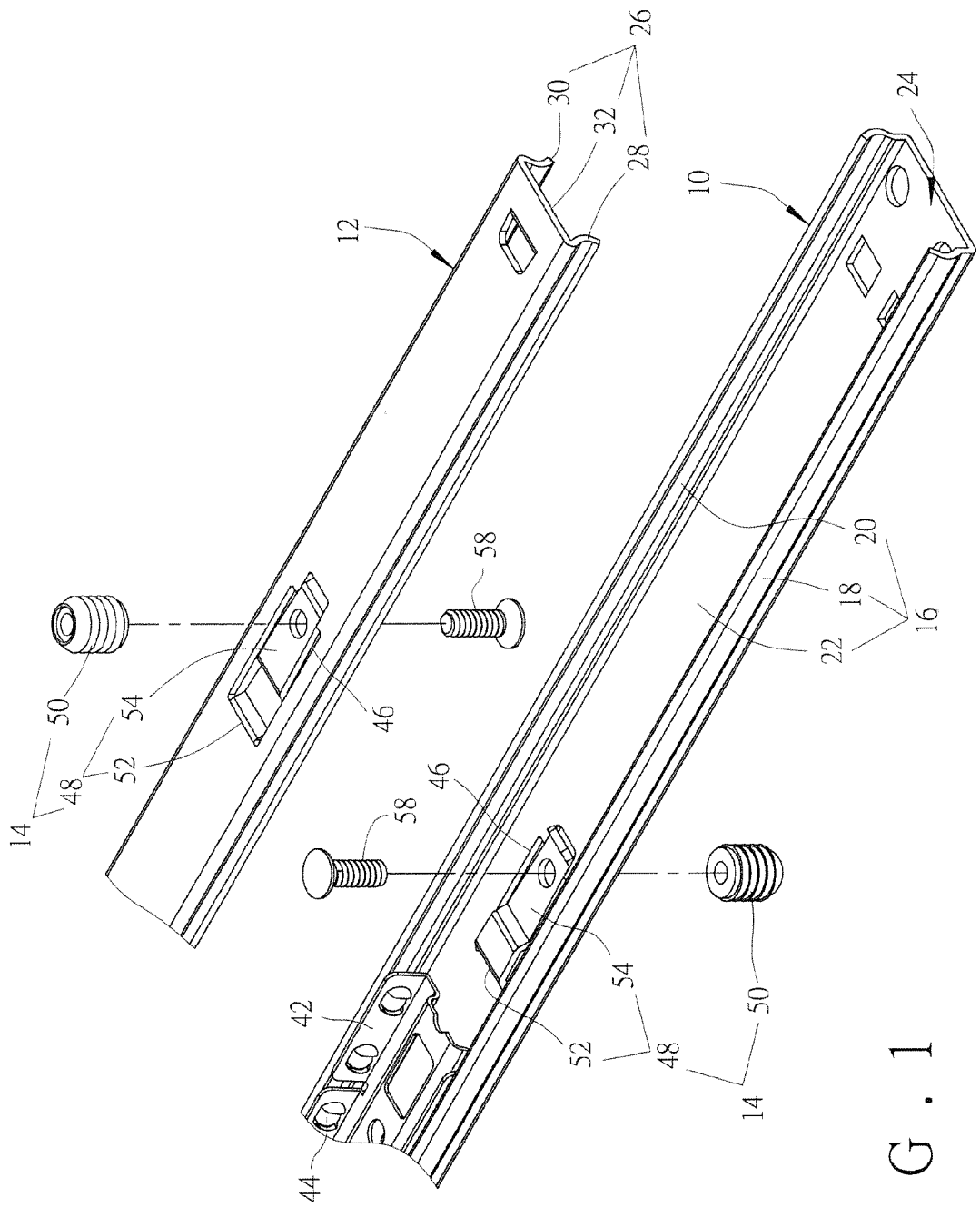
FIG. 1 is an exploded view of a slide assembly in accordance with a preferred embodiment of the present invention.
Figure 2:
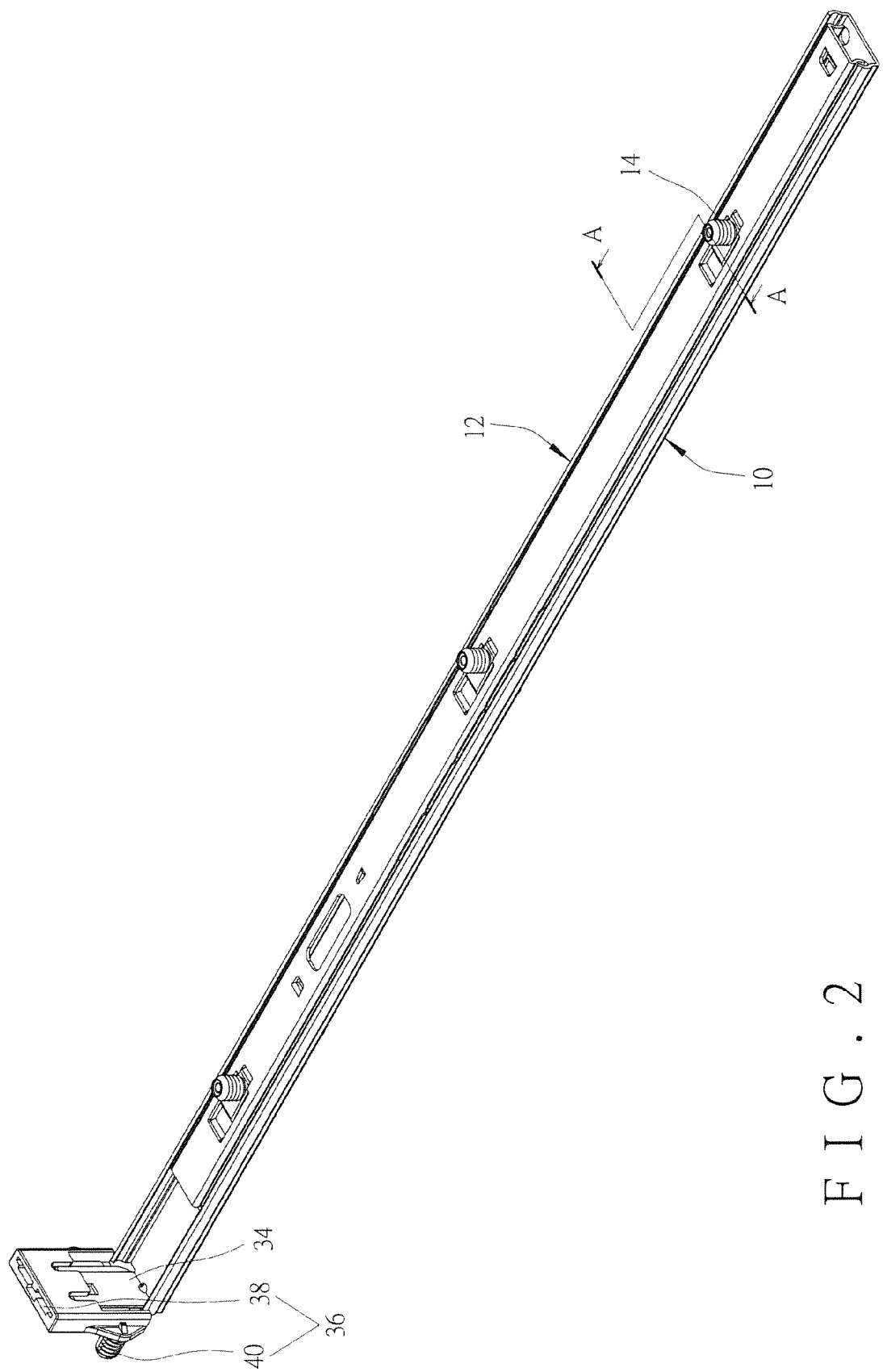
FIG. 2 is a perspective view of the slide assembly in accordance with the preferred embodiment of the present invention.

Referring to FIGS. 1 and 2, a slide assembly in accordance with a preferred embodiment of the present invention comprises a first rail 10, a second rail 12 and at least one positioning device 14.

The first rail 10 has a first elongate body 16, and the first elongate body 16 has a first wall 18, a second wall 20 opposite to the first wall 18, and a side wall 22 extending between the first wall 18 and the second wall 20, wherein a path 24 is bounded by the first wall 18, the second wall 20 and the side wall 22.

The second rail 12 is slidably received in the path 24 of the first rail 10 such that the second rail 12 is longitudinally movable relative to the first rail 10. In detail, the second rail 12 has a second elongate body 26, wherein the second elongate body 26 has two lateral walls 28, 30 and an intermediate wall 32 extending between the two lateral walls 28, 30. Preferably, the slide assembly further comprises a connection frame 36 which has a slot 38 and at least one latch 40, and a distal end 34 of the first rail 10 is inserted into the slot 38 of the connection frame 36 such that the slide assembly is adapted to be fixed to a cabinet (not shown) by the at least one latch 40 of the connection frame 36.

Figure 3:
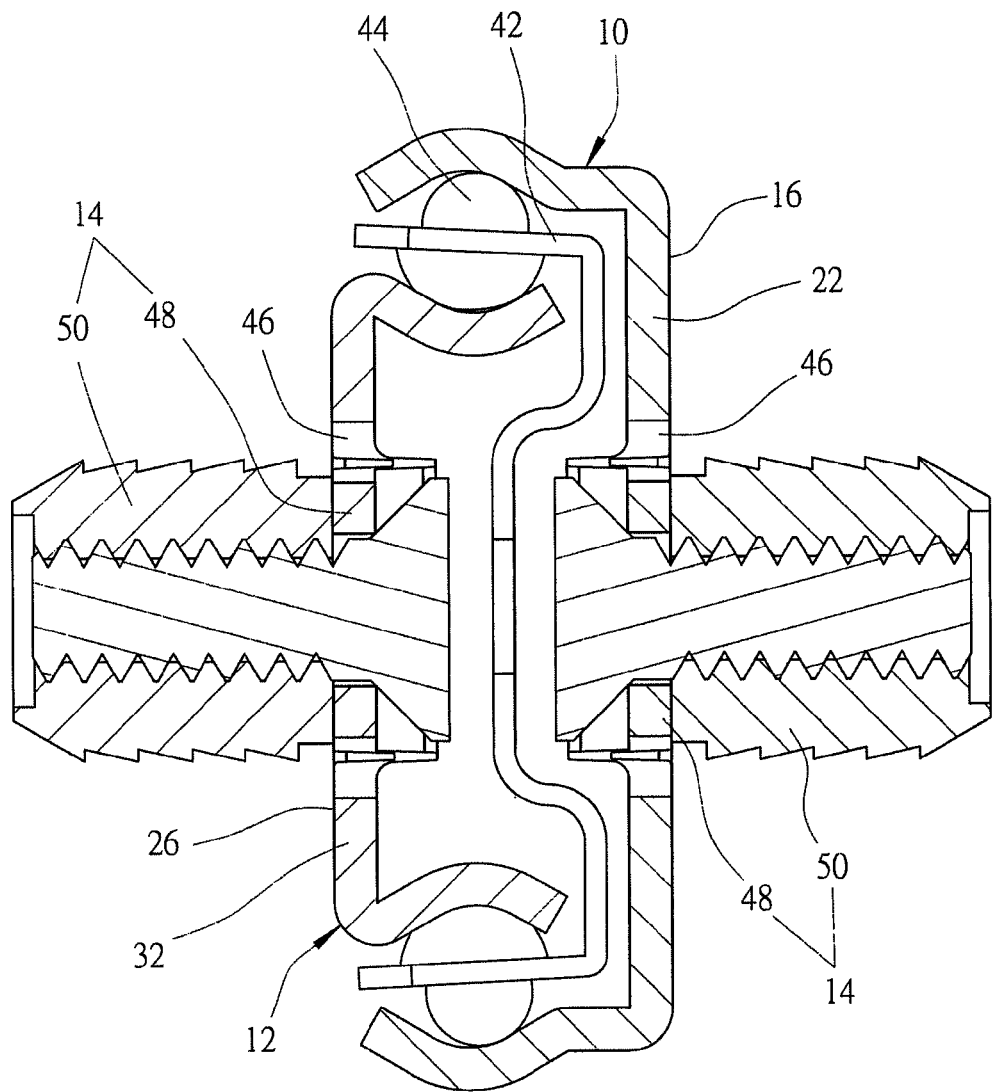
FIG. 3 is a cross sectional view, taken along line A-A in FIG. 2.

Preferably, with reference to FIG. 3, a ball bearing retainer 42 is disposed between the first rail 10 and the second rail 12 and retains a plurality of ball bearings 42 therewith so as to facilitate sliding movement of the second rail 12 relative to the first rail 10, thus forming a two-stage ball bearing slide assembly.

The at least one positioning device 14 has a support member 48 and a dowel 50. The intermediate wall 32 of the second elongate body 26 of the second rail 12 has an opening 46 defined therein, and the at least one positioning device 14 is connected to the intermediate wall 32 of the second elongate body 26 of the second rail 12.

Referring to FIGS. 4 and 5, the support member 48 of the at least one positioning device 14 has a fixing portion 52 and a resilient arm 54. The resilient arm 54 is connected to the fixing portion 52, and the fixing portion 52 is securely connected to the second elongate body 26 of the second rail 12. In detail, the fixing portion 52 can be fixed to the second elongate body 26 by way of threading, riveting, or any known method, but the fixing portion 52 also can be integrally formed with the second elongate body 26 by way of punching, stamping, or any known method.

At least one portion of the resilient arm 54 is fitted within the opening 46 and is supported by an inner wall of the opening 46. In detail, the resilient arm 54 has a bent portion 56, and the bent portion 56 abuts against the inner wall of the opening 46 when the at least one portion of the resilient arm 54 fitted within the opening 46 is moved in response to a force applied thereon. The dowel 50 is disposed on the resilient arm 54 of the support member 48 and corresponds in position to the opening 46. In other words, the dowel 50 is disposed on the at least one portion of the resilient arm 54, such that the dowel 50 is allowed to be transversely moved together with the at least one portion of the resilient arm 54 relative to the slide assembly. Preferably, the positioning device 14 has a fixing member 58 which transversely extends through the resilient arm of the support member 48 and is securely fixed to the dowel 50. The fixing member 58 can be fixed to the dowel 50 by way of threading, riveting, or any known method.

Alternatively, the opening 46 is defined in the side wall 22 of the first elongate body 16 of the first rail 10, and the at least one positioning device 14 is connected to the side wall 22 of the first elongate body 16 of the first rail 10, wherein the fixing portion 52 of the support member 48 of the at least one positioning device 14 is securely connected to the first elongate body 16 of the first rail 10. The remaining arrangement and operation of the at least one positioning device 14 on the first elongate body 16 of the first rail 10 are the same as those disclosed above; thus, an explanation thereof is eliminated herein.

It is noted that the opening 46 and the at least one positioning device 14 is disposed on the first elongate body 16 and/or the second elongate body 26. In other words, the opening 46 and the at least one positioning device 14 can be disposed on one of the first elongate body 16 and the second elongate body 26, or be disposed on both of the first elongate body 16 and the second elongate body 26.

Figure 6:
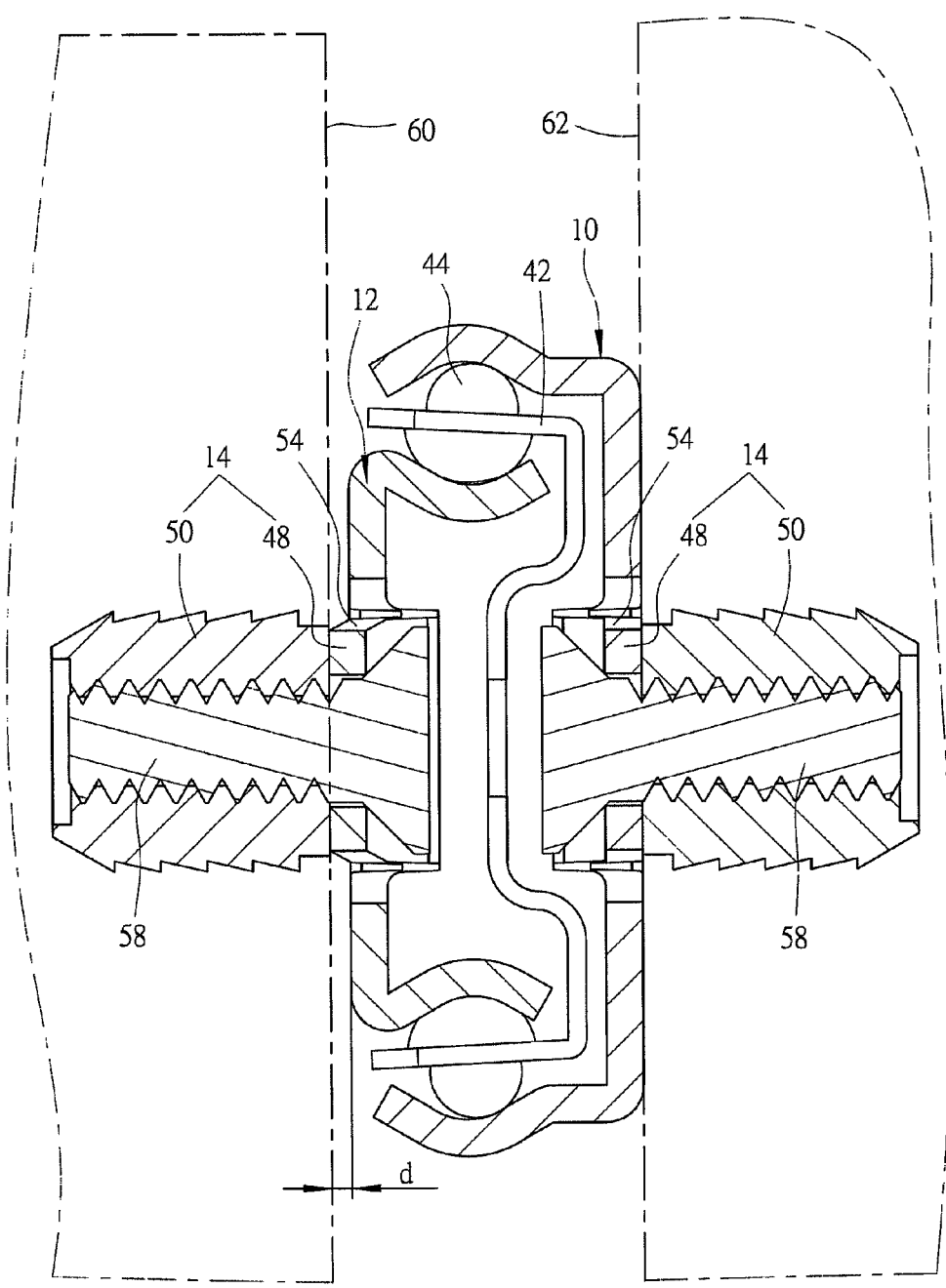
FIG. 6 is a cross sectional view of a slide assembly in accordance with a first embodiment of the present invention, wherein the slide assembly is connected between a drawer and a cabinet.

In a first embodiment of the present invention, as shown in FIG. 6, the first elongate body 16 of the first rail 10 and the second elongate body 26 of the second rail 12 each have the opening 46 and the positioning device 14 disposed thereon, and wherein the dowel 50 of the positioning device 14 disposed on the first elongate body 16 is installed to a cabinet 62, and the dowel 50 of the positioning device 14 disposed on the second elongate body 26 is installed to a drawer 60. Since the dowels 50 are disposed on their respective resilient arms 54, when there is an assembly tolerance between the drawer 60 and the cabinet 62, the dowels 50 are capable of being moved transversely together with their respective resilient arms 54 to compensate the tolerance "d" and therefore facilitate rolling movement of the ball bearings 44 retained by the ball bearing retainer 42. Preferably, the dowel 50 and the fixing member 58 are secured together to form an integral member, which has better structural strength, so as to avoid the dowel 50 from deformation, broken and dropping from the support member 48 because of quality flaw or over-load.

Figure 7:
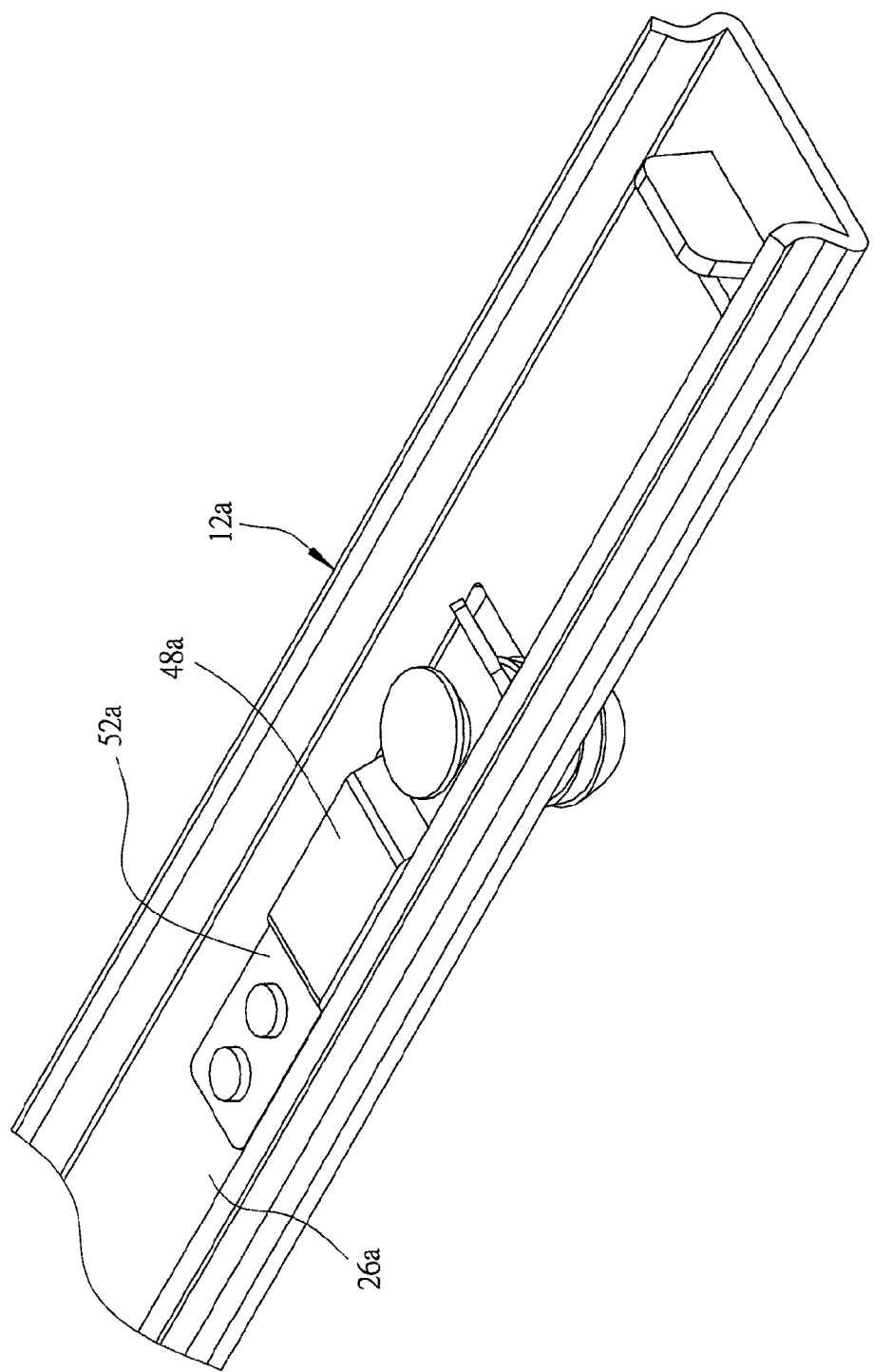
FIG. 7 is a perspective view showing a portion of a slide assembly in accordance with a second embodiment of the present invention.

FIG. 7 shows a second embodiment of the present invention, wherein the support member 48a and the second elongate body 26a of the second rail 12a are two individual members and are connected to each other by fixing the fixing portion 52a of the support member 48a to the second elongate body 26a of the second rail 12a by way of riveting.

Figure 8A:
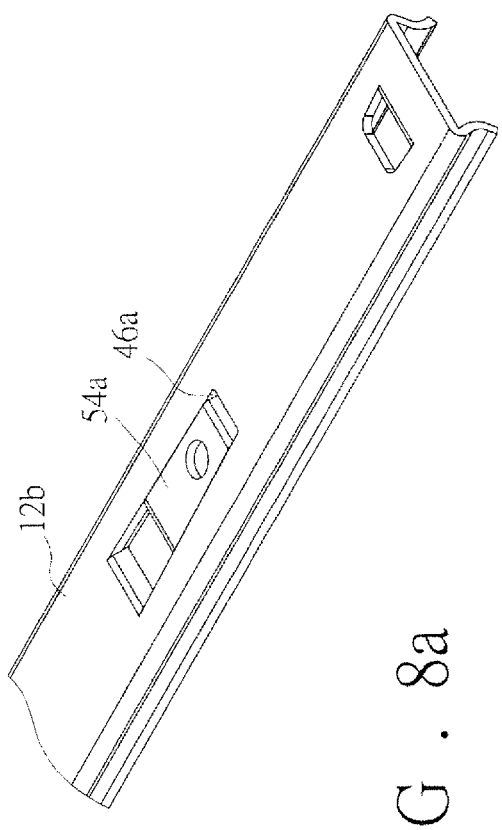
FIG. 8a is a perspective view showing a portion of a slide assembly in accordance with a third embodiment of the present invention.
Figure 8B:
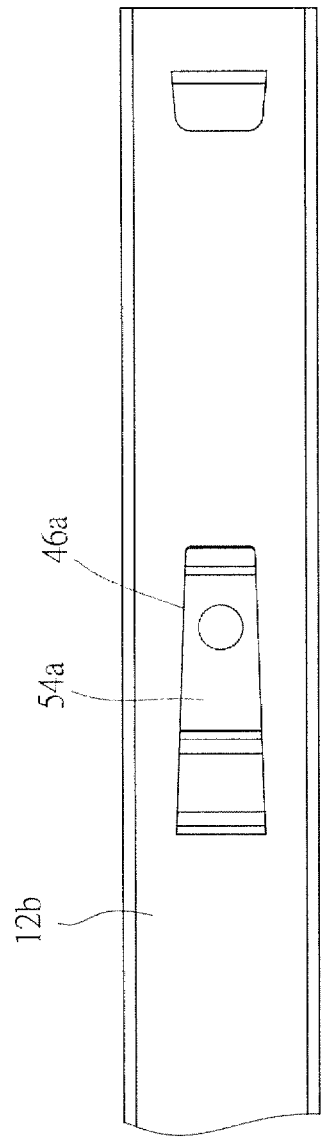
FIG. 8b is a plan view showing the portion of the slide assembly in accordance with the third embodiment of the present invention.

FIGS. 8a and 8b show a third embodiment of the present invention wherein the whole resilient arm 54a is fitted within the opening 46a of the second rail 12b and corresponds in shape to the inner wall of the opening 46a. Therefore, when the resilient arm 54a is resiliently moved within the opening 46a, the contact between the inner wall of the opening 46a and the resilient arm 54a is of large area, and thus the resilient arm 54a is better supported by the inner wall of the opening 46a.

Figure 9:
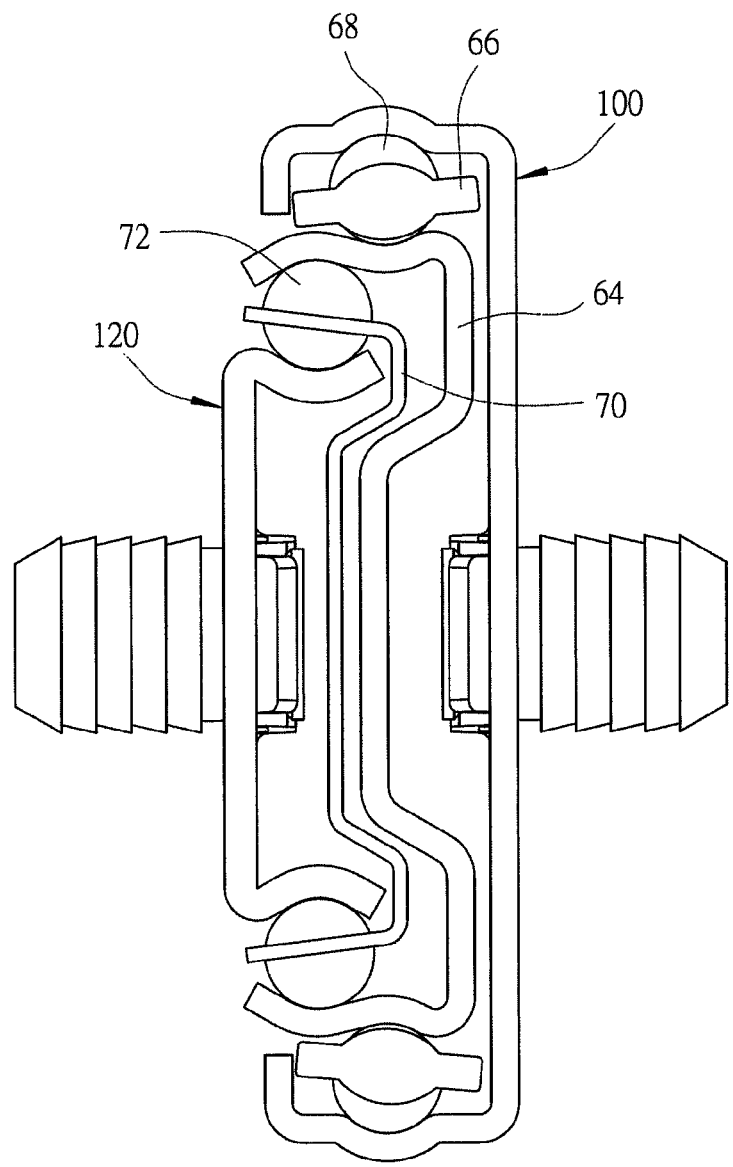
FIG. 9 is a side view of a slide assembly in accordance with a fourth embodiment of the present invention.

FIG. 9 shows a fourth embodiment of the present invention, wherein an intermediate rail 64 is slidably connected between the first rail 100 and the second rail 120. Furthermore, a first ball bearing retainer 66 is disposed between the first rail 100 and the intermediate rail 64 and retains a plurality of first ball bearings 68 therewith so as to facilitate sliding movement of the intermediate rail 64 relative to the first rail 100, and a second ball bearing retainer 70 is disposed between the second rail 120 and the intermediate rail 64 and retains a plurality of second ball bearings 72 therewith so as to facilitate sliding movement of the second rail 120 relative to the intermediate rail 64, thus forming a three-stage slide assembly.

Figure 10:
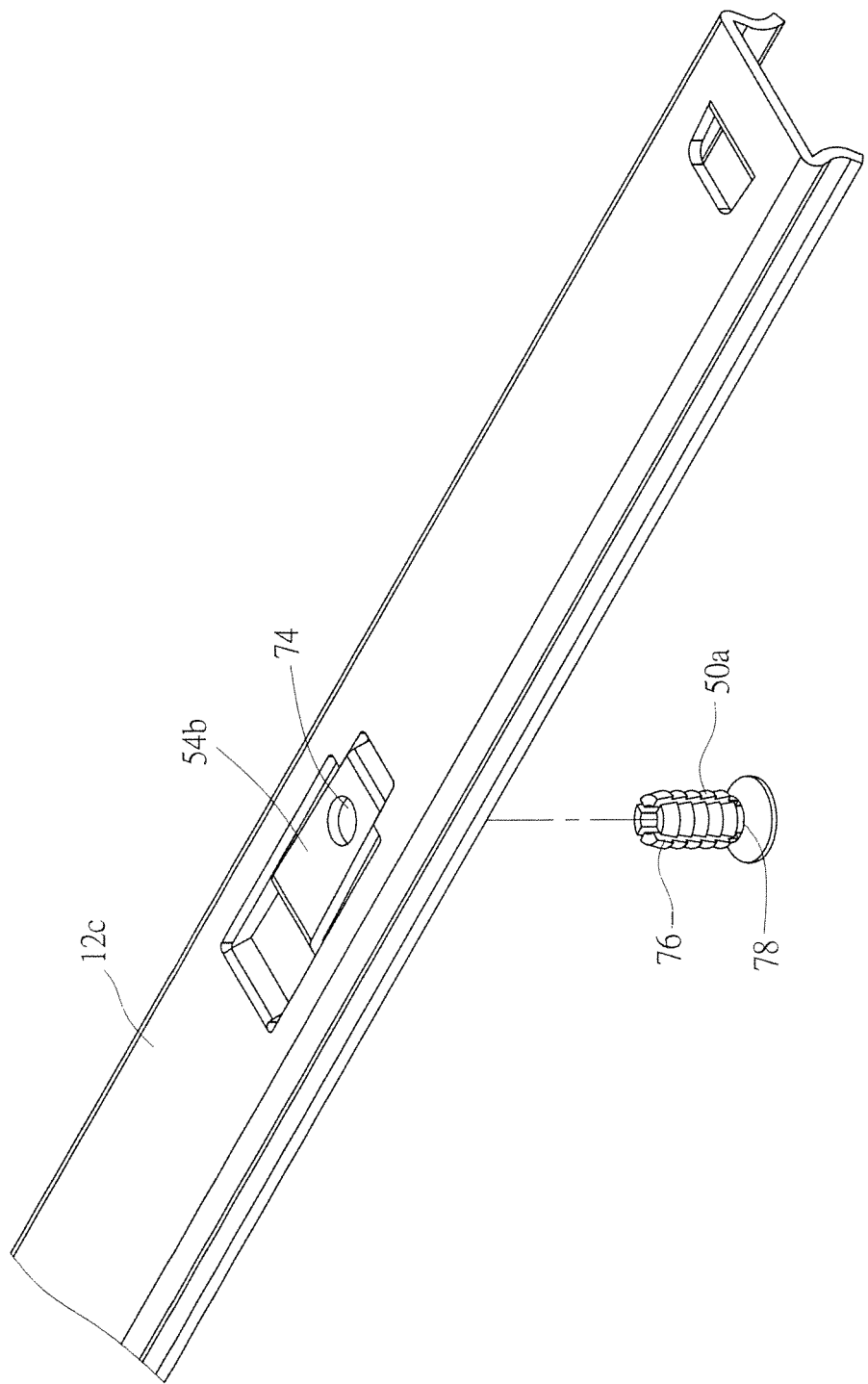
FIG. 10 is an exploded view of a slide assembly in accordance with a fifth embodiment of the present invention.

FIG. 10 shows a fifth embodiment of the present invention, wherein the resilient arm 54*b* has an installation hole 74. The dowel 50*a* is tubular-shaped and has a plurality of axial slots 76 and an engaging portion 78 disposed thereon. The plurality of axial slots 76 enables the dowel 50*a* to be flexible, and thus the dowel 50*a* can be inserted into the installation hole 74 by the flexibility thereof and then be securely connected to the resilient arm 54*b* by the engaging portion 78 thereof.

While we have shown and described the embodiment in accordance with the present invention, it should be clear to those skilled in the art that further embodiments may be made without departing from the scope of the present invention.

What is claimed is:

1. A slide assembly comprising:
   a first rail having a first elongate body with an inner side;
   a second rail having a second elongate body with an inner side, the first and second rails being coupled in longitudinally slidable manner with the inner sides of the first and second rails opposing one another, wherein at least one of the first and second elongate bodies has a body opening formed therein; and
   at least one positioning device having a support member and a dowel, the support member defining a fixing portion fixed to the at least one of the first and second elongate bodies, and a resilient arm having a bent portion extending from the fixing portion with the resilient arm having a resilient arm opening through which a fixing member passes, said resilient arm terminating at a free end to remain transversely deflectable, the bent portion being received in said body opening to engage an inner wall thereof when the resilient arm is moved in response to a force applied thereon, the dowel being disposed on the resilient arm of the support member in transverse alignment and coupled to said fixing member to extend transversely away from an outer surface of the at least one of the first and second elongate bodies wherein said fixing member transversely extends through the resilient arm of the support member and is securely fixed to the dowel.

2. The slide assembly as claimed in claim 1, further comprising a ball bearing retainer disposed between the first rail and the second rail, the ball bearing retainer retaining a plurality of ball bearings therewith so as to facilitate sliding movement of the second rail relative to the first rail.

3. The slide assembly as claimed in claim 1, further comprising an intermediate rail, a first ball bearing retainer and a second ball bearing retainer, wherein the intermediate rail is slidably connected between the first rail and the second rail; the first ball bearing retainer is disposed between the first rail and the intermediate rail and retains a plurality of first ball bearings therewith so as to facilitate sliding movement of the intermediate rail relative to the first rail; and the second ball bearing retainer is disposed between the second rail and the intermediate rail and retains a plurality of second ball bearings therewith so as to facilitate sliding movement of the second rail relative to the intermediate rail.

4. The slide assembly as claimed in claim 1, further comprising a connection frame having a slot and at least one latch, wherein a distal end of the first rail is inserted into the slot of the connection frame.

\* \* \* \* \*